United States Patent
Mathews et al.

(10) Patent No.: US 7,743,379 B2
(45) Date of Patent: Jun. 22, 2010

(54) VARIABLE RESOURCE SETS

(75) Inventors: Thomas Stanley Mathews, Austin, TX (US); James B. Moody, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1377 days.

(21) Appl. No.: 11/181,408

(22) Filed: Jul. 14, 2005

(65) Prior Publication Data

US 2007/0016683 A1    Jan. 18, 2007

(51) Int. Cl.
*G06F 9/46* (2006.01)
*G06F 15/173* (2006.01)
*G06F 15/16* (2006.01)

(52) U.S. Cl. .................. 718/104; 718/102; 718/100; 709/226; 709/229

(58) Field of Classification Search .............. 718/104, 718/102, 100; 709/226, 229
See application file for complete search history.

(56) References Cited

U.S. PATENT DOCUMENTS

| | | | | |
|---|---|---|---|---|
| 5,615,400 | A | 3/1997 | Cowsar et al. | 395/685 |
| 6,199,094 | B1 | 3/2001 | Presler-Marshall | 709/104 |
| 6,587,938 | B1 * | 7/2003 | Eilert et al. | 712/29 |
| 6,732,140 | B1 * | 5/2004 | McCue | 718/104 |
| 6,947,987 | B2 * | 9/2005 | Boland | 709/226 |
| 2003/0167329 | A1 * | 9/2003 | Kurakake et al. | 709/226 |
| 2003/0187908 | A1 * | 10/2003 | Boucher | 709/103 |

FOREIGN PATENT DOCUMENTS

EP    0 033915 A1    8/1981

OTHER PUBLICATIONS

Janis, "Reference Monitor—Creating a Relationship Between a Resource and a Resource Set", IBM Technical Disclosure Bulletin, No. 10a, Mar. 1990, p. 423.
Janis, "Reference Monitor—Location of Resource Set Access", IBM Technical Disclosure Bulletin, No. 10a, Mar. 1990, p. 396.
Janis, "Reference Monitor—Destroying a Relationship Between a Resource and a Resource Set", IBM Technical Disclosure Bulletin, No. 10a, Mar. 1990, p. 421.

* cited by examiner

*Primary Examiner*—Thomas Lee
*Assistant Examiner*—Tammy Lee
(74) *Attorney, Agent, or Firm*—Yee & Associates, P.C.; Matthew W. Baca

(57) ABSTRACT

A method, system and computer program product are provided for representing resource sets in a variable format. Variable resource sets are represented in two parts: a system topology domain and a system detail level. Logical entities are allowed to consume variable resource sets to specify the domain and level required in the attachment. Thus, the resource set attachment is made using a domain system detail level, but the actual resources represented are derived dynamically. That is, the elements that were once statically represented by bits in the resource set are now derived dynamically to reflect the system state at the time they are being used.

21 Claims, 3 Drawing Sheets

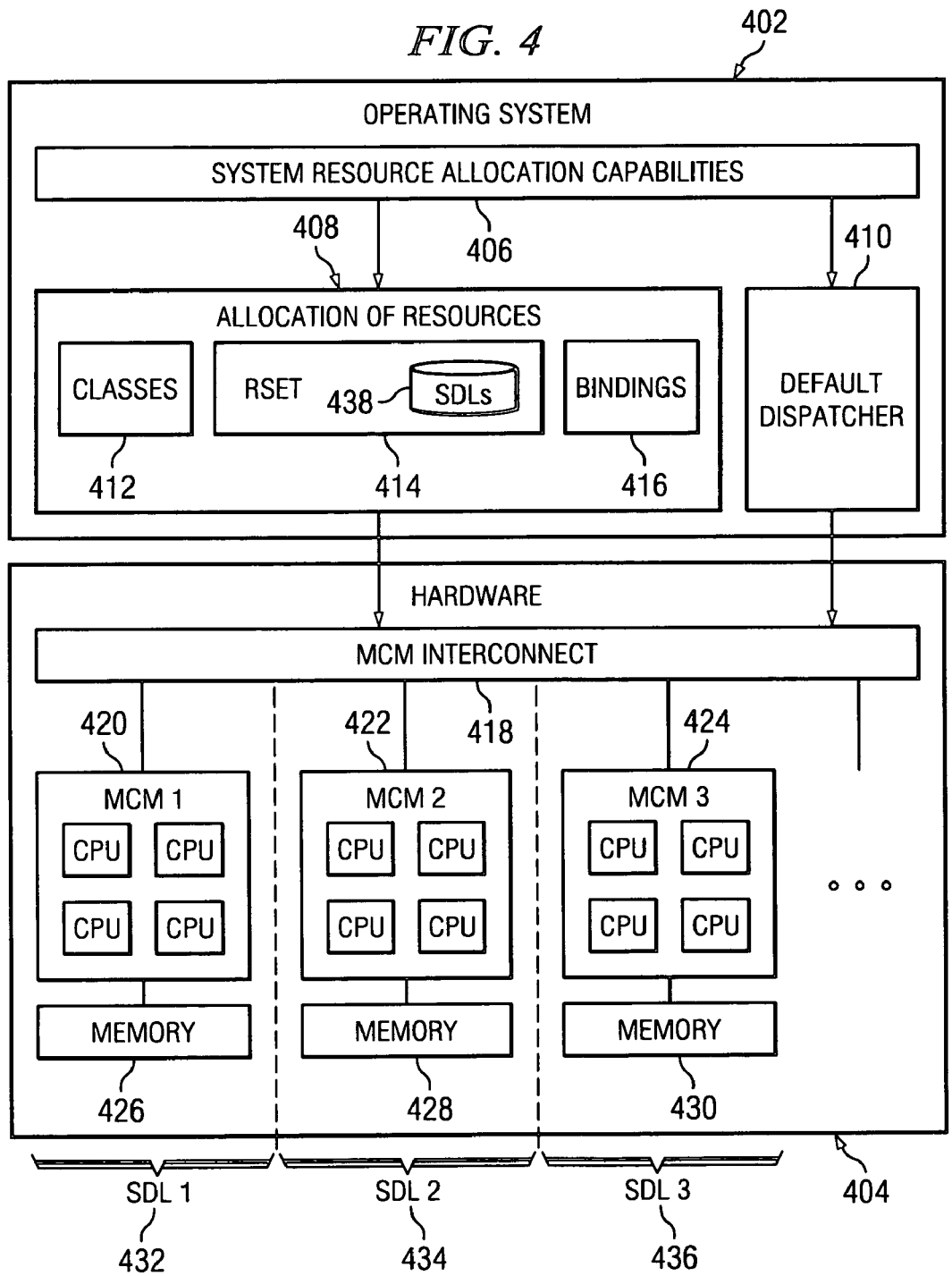

VARIABLE RESOURCE SETS

BACKGROUND OF THE INVENTION

1. Field of the Invention

The present invention relates generally to resource sets. Still more particularly, the present invention changes the way resource sets are represented.

2. Description of the Related Art

A resource set (RSET) is a structure that identifies physical resources. An RSET parameter issued in resource set application protocol interfaces (APIs) or commands is to either get information from the system regarding resources or to pass information about requested resources to the system. Applications and job schedulers can attach an RSET to a process. Attaching an RSET to a process limits the process to use only the resources contained in the RSET. The central processing unit (CPU) and memory resources in a resource set are represented by bitmaps. The primary use of RSETs is to perform CPU topology and affinity operations. CPUs are identified in RSETs by logical CPU IDs. For example, a partition with two multi-chip modules (MCMs) of eight processors each can have their 16 logical CPU IDs assigned in any order. Using RSET APIs, applications cannot assume that logical CPU IDs 0-7 are in one MCM and IDs 8-15 are contained in the other MCM.

The set of logical CPU IDs available in a system might not be contiguous. There can be gaps in logical CPU ID numbers. This can occur when CPUs are dynamically reconfigured out of a partition. Some systems allocate logical CPU IDs for the online CPUs sequentially at boot time. The main system-defined resource sets are:

System RSET and sys/sys: This resource set contains the available (online) CPU and memory pool resources in the system or partition. On partitionable machines, this RSET contains only the resources that are in the operating system's partition.

Node RSETs, sys/node.mm.nnnnn, or sys/node.nnnnn: These RSETs contain resources that are present at various system detail levels (mm) and indexes (nnnnn) in the system. For example, if system detail level 04 represents the level in the system topology that corresponds to a p690 MCM, RSET sys/node.04.00000 contains the resources in an MCM 0. RSET sys/node.04.00001 contains the resources in another MCM 1, and so on.

Atomic RSETS, sys/cpu.nnnnn, or sys/mem.nnnnn: These RSETs contain a single resource, either a CPU or memory pool. There are atomic resource sets for every available (online) resource contained in the operating system's partition.

The resource set configuration is displayed with the lsRSET command. There are two types of RSET, the partition RSET and the effective RSET:

The partition RSET can only be attached, modified, or detached by a root user. Some managers attach a partition RSET when a process is classified with a work class that contains an RSET. There is only one partition RSET per process and it is updated by replacement. For example, a process is started with a specific class that attaches a partition RSET that contains CPUs 0-3. Later a root user attaches an RSET that contains CPUs 2-7. The partition RSET attached by manager is replaced by the new RSET. The process now runs on CPUs 2-7.

The effective RSET, generally used by applications, can be attached by root users and non-root users with a CAP_NUMA_ATTACH. Effective RSET limits a process to run only on the resources (CPUs, memory) contained in the RSET. This means that the effective RSET of a process cannot contain more resources than the process' partition RSET. For example, a process may have a partition RSET established by the WLM that limits the process to running only on CPUs 0-3. A user can attach an effective RSET with CPUs 2-3, and the process is limited to running only on CPUs 2-3. An attempt by the user to attach an effective RSET with CPUs 2-7 would be rejected because the user attempted to use resources outside its partition RSET.

Only recently has the partition RSET been used. In the future, job schedulers may also use partition RSET. The RSET commands provide an easy way for system administrators to use system RSETs. Commands are provided to make, display, and remove RSETs from the system registry. Other commands allow RSETs to be attached to running processes or a command attached to an RSET.

Thus, the concept of an RSET is used to represent a subset of the system's physical resources such as CPUs. Once an RSET is created, it can be associated with logical resources such as a virtual memory object or a process. The operating system than restricts those logical resources to the physical resources contained within the RSET to which they are associated. For example, a process can use an RSET to attach itself to the CPU described in the RSET. Each element in the SRET describes a CPU, and the process attaches to all the elements.

Currently, the set of resources described by the RSET remains unchanged, or static, throughout the life of the RSET. However, in an environment where the system configuration is dynamically changing; processors and memory can be added and removed from the system. An RSET once created does not change to reflect changes in the system configuration. As an example of this problem is where using a RSET, a bind is made between a process and a set of CPUs that have an affinity with one another. A processor re-configuration operation can subsequently add another process that has an affinity to the CPUs in the processes RSET. But the process will remain bound only to those processors that are contained in the RSET and will not be dispatched on the additional processors that were added to the node dynamically. It may have been an administrator's intention to run the process on all CPUs that have the same affinity, but since the view changed, the information was lost to the process.

Thus, it would be advantageous to have an improved method, apparatus, and computer usable code that allows an RSET to be used in a dynamic environment.

SUMMARY OF THE INVENTION

The present invention changes the way resource sets are represented. The present invention breaks the concept of the resource set into two parts: a system topology domain and a system detail level. The present invention allows the logical entities that consume resource sets to specify the domain and level required in the attachment. Thus, the resource set attachment is made using a domain system detail level, but the actual resources represented are derived dynamically. That is, the elements that were once statically represented by bits in the resource set are now derived dynamically to reflect the system state at the time they are being used.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram of an exemplary configuration of a data processing system in accordance with an illustrative embodiment of the present invention.

DETAILED DESCRIPTION OF THE PREFERRED EMBODIMENT

Figure 1:
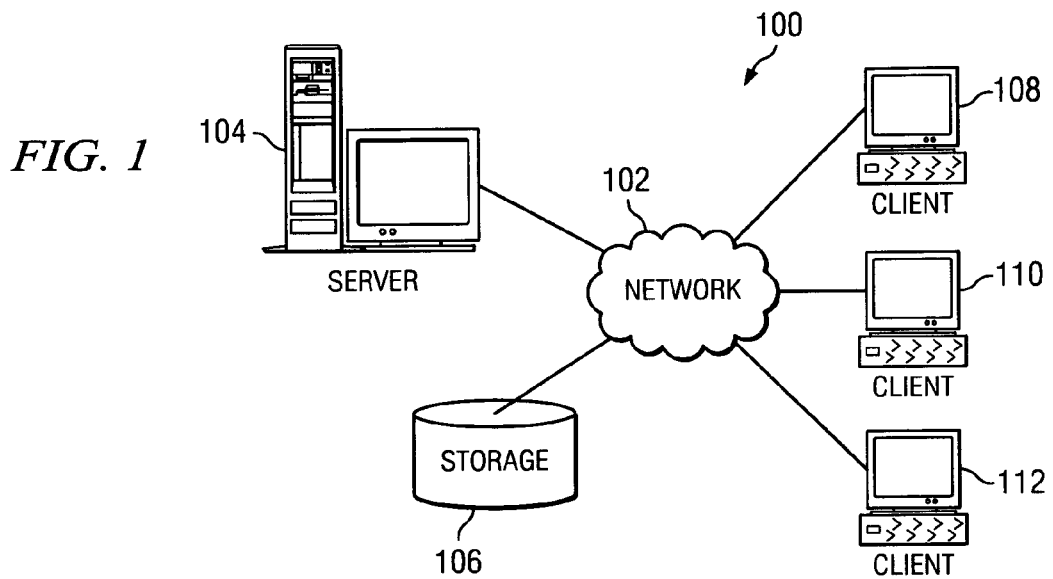
FIG. 1 is a pictorial representation of a network of data processing systems in which embodiments of the present invention may be implemented.
Figure 2:
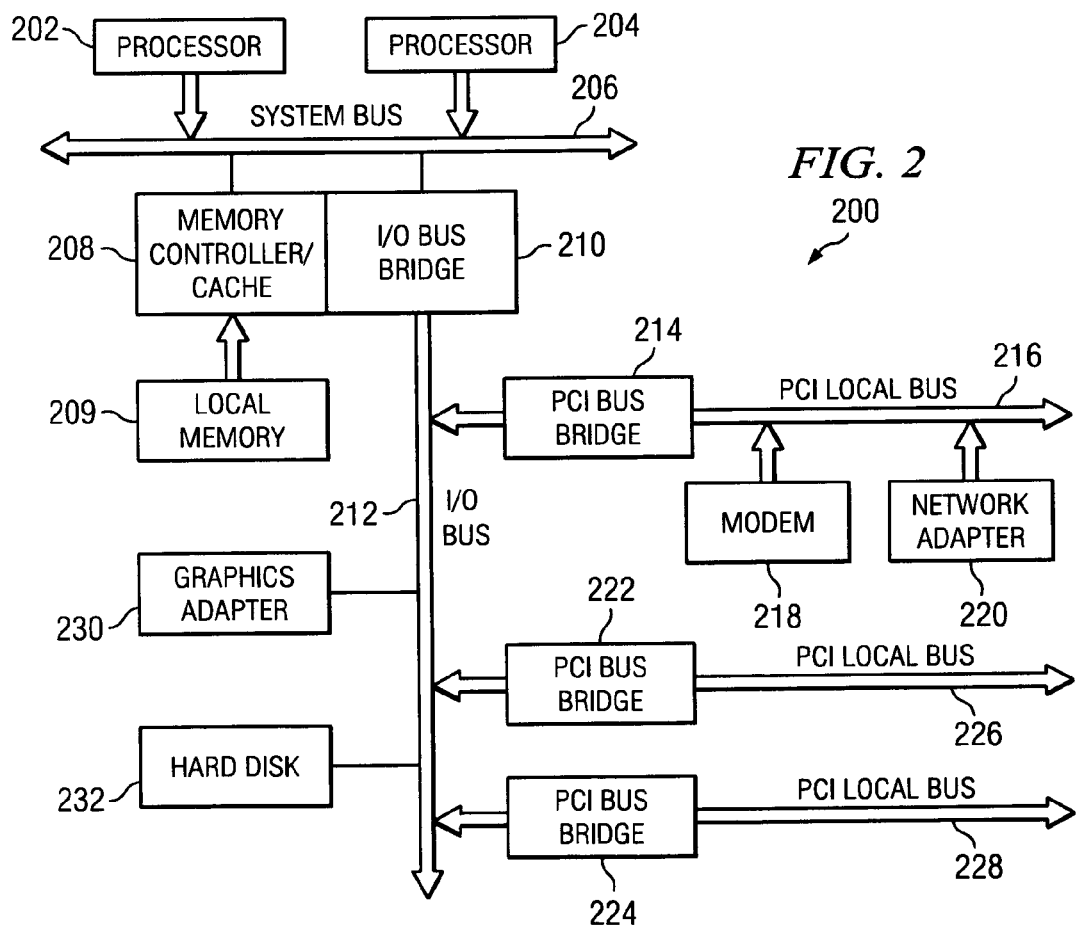
FIG. 2 is a block diagram of a data processing system that may be implemented as a server in accordance with an embodiment of the present invention.
Figure 3:
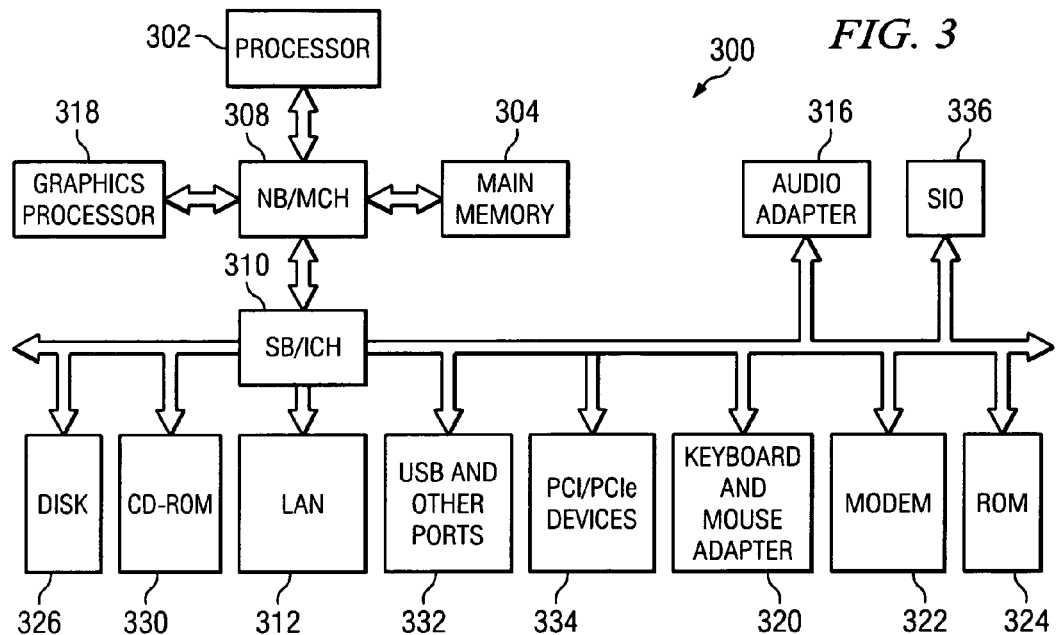
FIG. 3 is a block diagram of a data processing system in which embodiments of the present invention may be implemented.

Embodiments of the present invention provide a method, apparatus, and computer program product for a variable resource set (RSET) that allows an RSET to be used in a dynamic environment. The data processing device may be a stand-alone computing device or may be a distributed data processing system in which multiple computing devices are utilized to perform various aspects of embodiments of the present invention. Therefore, the following FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which embodiments of the present invention may be implemented. Many modifications to the depicted environments may be made without departing from the spirit and scope of the present invention.

With reference now to the figures, FIG. 1 depicts a pictorial representation of a network of data processing systems in which embodiments of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In accordance with an embodiment of the present invention, server 104 provides application integration tools to application developers for applications that are used on clients 108, 110, and 112. More particularly, server 104 may provide access to application integration tools that will allow two different front-end applications in two different formats to disseminate messages sent from each other.

In accordance with one illustrative embodiment, a dynamic framework is provided for using a graphical user interface (GUI) for creating and editing message formats. This framework involves the development of user interface (UI) components for message data elements in the visualization and building of message formats, which may exist on storage 106. This framework may be provided through an editor mechanism on server 104 in the depicted example. The UI components and message data elements may be accessed, for example, using a browser client application on one of clients 108, 110, and 112.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for embodiments of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX® operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

The present invention provides a method, apparatus, and computer useable code that changes the way resource sets are represented. The concept of the resource set is broken into two parts: a system topology domain and a system detail level. The logical entities that consume resource sets are allowed to specify the domain and level required in the attachment. Thus, the resource set attachment is made using domain system detail level (SDL), but the actual resources represented are derived dynamically. That is, the elements that were once statically represented by bits in the resource set are now derived dynamically to reflect the system state at the time they are being used.

Turning to FIG. 4, a block diagram is depicted of exemplary configuration of a data processing system in accordance with an illustrative embodiment of the present invention. In this exemplary configuration, operating system 402 interfaces with hardware 404 such as processor 202 or 204 of FIG. 2. Operating system 402 contains system resource allocation capabilities 406. System resource allocation capabilities 406 allows for an allocation of resources 408, which may be implemented by an administrator or user, and default dispatcher 410 allocation of resources. Allocation of resources 408 may provide for manual allocation of resources to processes through allocators such as classes 412, resource sets 414 and bindings 416. Resource set 414 contains a data structure 438 that defines the correlation of the system detail levels to the various resources in the data processing system. Default dispatch 410 balances processes across available hardware, such as hardware 404.

Hardware 404 is an exemplary architecture of a multi-chip module (MCM) system. Operating system 402 interfaces with hardware 404 through MCM interconnect 418. Multichip modules 420, 422, and 424 are connected to MCM interconnect 418 as well as being connected to memory 426, 428, and 430. While the depicted example shows only three MCMs, any number of MCMs may be connected to MCM Interconnect 418. Memory 426, 428, and 430 may be any type of data storage device such as L1 cache.

In accordance with a preferred embodiment of the present invention, resource set (RSET) 414 is implemented as variable RSETS. As stated previously, current RSETs describe the resources (hardware) for a particular process. For example, for a process A, the related hardware may be MCM 422. The mechanism of the present invention changes the way RSETs are represented. A variable RSET does not contain the specific resources themselves but an identifier to a domain, resource affinity domain (RAD), at a particular level, system detail level (SDL), in the system definition topology.

A variable RSET may represent an empty set of CPUs such as those on MCMs 420, 422, and 424. The SDL component of the variable RSET may be downgraded by the operating system if there are no resources present in the level that was specified. In the exemplary architecture shown in FIG. 4, MCM 420 is shown to be in Level 1 432, MCM 422 is shown to be in Level 2 434, and MCM 424 is shown to be in Level 3 436. Thus, if a process has a defined variable RSET of (1,3), where 1 represents the system topology domain and 3 represents the system detail level, the process would use the resources of MCM 424 in level 3 436.

However, if MCM 424 has been removed from the data processing system, the system detail level of the variable RSET may be downgraded to (1,2) and then to (1,1) and so on until the variable RSET contains available system resources. The variable RSET still contains (1,3), so, if in the future if the resources are added back to the data processing system at this level in the system topology, then the variable RSET will be able to find them. While the depicted data processing system in these examples depicts only three system detail levels, any number of system detail levels may be defined to include any number of different resources, depending on the particular implementation. The use of variable RSETs avoids a scenario where a processor cannot be removed from the data processing system because it has been used in an attachment.

Additionally, as new resources become available or as previously unavailable resources become available in the data processing system, a user may be notified of the new resources being available. Then the user is able to update the various existing system detail levels based on the new resources or add new system detail levels. The system detail level associations are then stored in data structure 438, the associations defining the correlation of the system detail levels to the various resources in the data processing system. The system detail level is a unique data structure that is maintained in association with the system topology domain. Although the variable RSET is a combination of the system detail level and the system topology domain, aspects of the present invention allow for the system detail level and the system topology domain to be stored separately in a domain/level view.

Figure 5:
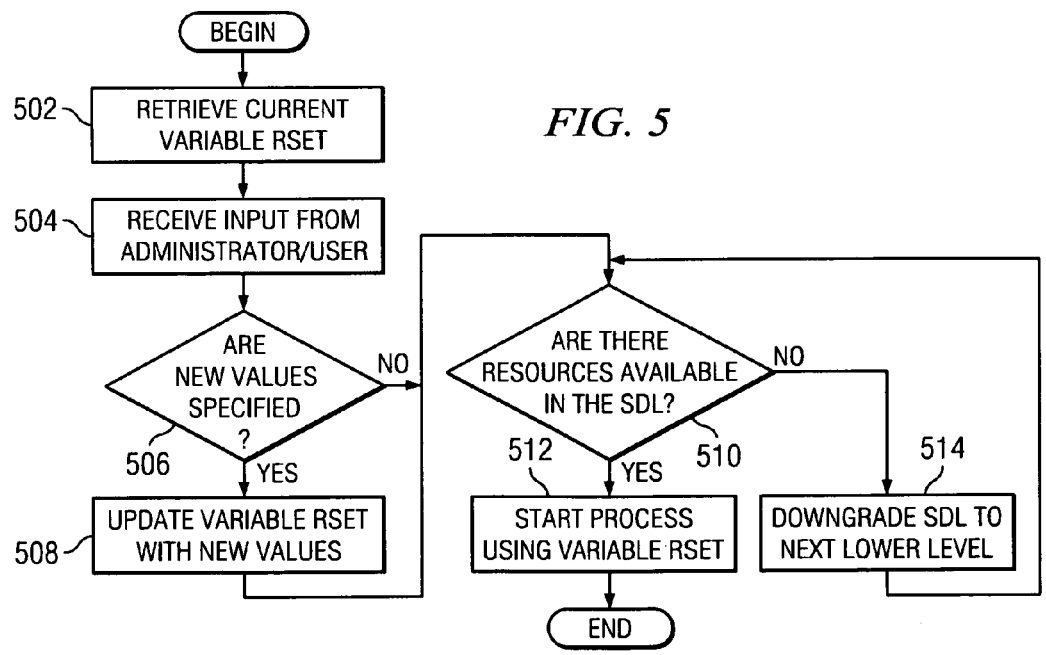
FIG. 5 depicts a flowchart of a variable RSET operation in accordance with an illustrative embodiment of the present invention.

FIG. 5 depicts a flowchart of a variable RSET operation in accordance with a preferred embodiment of the present invention. As the operation begins a process is started and the variable RSET associated with that process is retrieved (step 502). The variable RSET contains an identifier to a system topology domain and a system detail level. If new values for the system topology domain or the system detail level are to be used in the variable RSET, they are received at this point in the operation (step 504). A check is made as to whether new values for the variable RSET have been received from an administrator or user (step 506).

If new values for the variable RSET have been received, then the variable RSET is updated with the new values (step 508). If at step 506 no new values have been received, then resource availability of the identified system detail level in the variable RSET is validated (step 510). If the resources are available, the process is started using the identified resources (step 512), with the operation ending thereafter. If at step 510 resources are not available, the system detail level is dynamically downgraded to the next lower level (step 514). The operation then returns to step 510 where resource availability of the next lower identified system detail level in the variable RSET is checked, with the process continuing to step 512 or 514 as described above.

Thus the mechanisms of the present invention changes the way resource sets are represented. A variable resource set is defined in two parts: a system topology domain and a system detail level. Logical entities that consume the resource sets specify a domain and a level that is required in the attachment. The variable resource set attachment is made using domain system detail level, but the actual resources represented are derived dynamically. That is, the elements that were once statically represented by bits in the resource set are now derived dynamically to reflect the system state at the time they are being used.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for using variable resource sets, the method comprising the steps of:

initially providing a system detail level for each physical resource set of a plurality of physical resource sets, wherein the plurality of physical resource sets are respectively associated with said system and are each included in a system topology domain, each physical resource set includes hardware resources, and first and second physical resource sets in a given system topology domain are provided with respective first and second system detail levels that are different from each other;

receiving a request to start a process from a specified source of process requests;

prior to starting the requested process, retrieving a variable resource set associated with the process, wherein the variable resource set identifies said first physical resource set for use with the process, by specifying a system topology domain which comprises said given system topology domain, and by further specifying a system detail level which comprises said first system detail level;

prior to starting the requested process, determining whether resources of said first physical resource set are available to implement the process;

responsive to determining that resources of said first physical resource set are available, starting the process using said first physical resource set for implementation thereof;

responsive to determining that resources of said first physical resource set are not available, dynamically changing the system detail level specified by the variable resource set to said second system detail level; and responsive to determining that resources of said second physical resource set are available, starting the process using said second physical resource set for implementation thereof.

2. The method of claim 1,
wherein responsive to a new physical resource set becoming available to said system, providing a new system detail level for said new physical resource set, and adding said new system detail to said system for use by said variable resource set to identify said new physical resource set.

3. The method of claim 1,
wherein each of said physical resource sets is included in a system topology domain selected from one or more system topology domains respectively associated with said system.

4. The method of claim 1, wherein the system detail level defines resources associated with a given system detail level.

5. The method of claim 4, further comprising:
receiving a notification of previously unavailable resources becoming available;
notifying a user of the previously unavailable resources being available;
receiving input from the user to adjust resources within a specific system detail level; and
updating the specific system detail level to indicate the newly available resources.

6. The method of claim 4, further comprising:
receiving a notification of new resources being available;
notifying a user of the new resources being available;
receiving input from the user to adjust resources within a specific system detail level; and
updating the specific system detail level to indicate the new resources.

7. The method of claim 4, further comprising:
receiving a notification of new resources being available;
notifying a user of the new resources being available;
receiving input from the user to adjust resources within a new system detail level; and
updating the new system detail level to indicate the new resources.

8. A data processing system comprising:
a bus system;
a communications system connected to the bus system;
a memory connected to the bus system, wherein the memory includes a set of instructions; and
a processing unit connected to the bus system, wherein the processing unit executes the set of instructions to initially provide a system detail level for each physical resource set of a plurality of physical resource sets, wherein the plurality of physical resource sets are respectively associated with said system and are each included in a system topology domain, each physical resource set includes hardware resources, and first and second physical resource sets in a given system topology domain are provided with respective first and second system detail levels that are different from each other; to receive a request to start a process from a specified source of process requests; prior to starting the requested process, to retrieve a variable resource set associated with the process, wherein the variable resource set identifies said first physical resource set for use with the process, by specifying a system topology domain which comprises said given system topology domain, and by further specifying a system detail level which comprises said first system detail level; prior to starting the requested process, to determine whether resources of said first physical resource set are available to implement the process; responsive to determining that resources of said first physical resource set are available, to start the process using said first physical resource set for implementation thereof; responsive to determining that resources of said first physical resource set are not available, to dynamically change the system detail level specified by the variable resource set to said second system detail level; and responsive to determining that resources of said second physical resource set are available, to start the process using said second physical resource set for implementation.

9. The data processing system of claim 8, wherein responsive to a new physical resource set becoming available to said system, a new system detail level is provided for said new physical resource set, and said new system detail is added to said system for use by said variable resource set to identify said new physical resource set.

10. The data processing system of claim 8, wherein each of said physical resource sets is included in a system topology domain selected from one or more system topology domains respectively associated with said system.

11. The data processing system of claim 8, wherein the system detail level defines resources associated with a given system detail level.

12. The data processing system of claim 11, further comprising a set of instruction to receive a notification of previously unavailable resources becoming available; notify a user of the previously unavailable resources being available; receive input from the user to adjust resources within a specific system detail level; and update the specific system detail level to indicate the newly available resources.

13. The data processing system of claim 11, further comprising a set of instruction to receive a notification of new resources being available; notify a user of the new resources being available; receive input from the user to adjust resources within a specific system detail level; and update the specific system detail level to indicate the new resources.

14. The data processing system of claim 11, further comprising as set of instruction to receive a notification of new resources being available; notify a user of the new resources being available; receive input from the user to adjust resources within a new system detail level; and update the new system detail level to indicate the new resources.

15. A computer program product comprising:
a computer usable medium including computer usable program code for bulk deletion through segmented files, the computer program product including;
computer usable program code for initially providing a system detail level for each physical resource set of a plurality of physical resource sets, wherein the plurality of physical resource sets are respectively associated with said system and are each included in a system topology domain, each physical resource set includes hardware resources, and first and second physical resource sets in a given system topology domain are provided with respective first and second system detail levels that are different from each other;
computer usable program code for receiving a request to start a process from a specified source of process requests;
computer usable program code for retrieving a variable resource set associated with the process, prior to starting the requested process, wherein the variable resource set identifies said first physical resource set for use with the process, by specifying a system topology domain which comprises said given system topology domain, and by further specifying a system detail level which comprises said first system detail level;

computer usable program code for determining, prior to staffing the requested process, whether resources of said first physical resource set are available to implement the process;

computer usable program code, responsive to determining that resources of said first physical resource set are available, for starting the process using said first physical resource set for implementation thereof;

computer usable program code, responsive to determining that resources of said first physical resource set are not available, for dynamically changing the system detail level specified by the variable resource set to said second system detail level; and computer usable program code, responsive to determining that resources of said second physical resource set are available, for starting the process using said second physical resource set for implementation thereof.

16. The computer program product of claim 15, wherein responsive to a new physical resource set becoming available to said system, a new system detail level is provided for said new physical resource set, and said new system detail is added to said system for use by said variable resource set to identify said new physical resource set.

17. The computer program product of claim 15, wherein each of said physical resource sets is included in a system topology domain selected from one or more system topology domains respectively associated with said system.

18. The computer program product of claim 15, wherein the system detail level defines resources associated with a given system detail level.

19. The computer program product of claim 18, further comprising:

computer usable program code for receiving a notification of previously unavailable resources becoming available;

computer usable program code for notifying a user of the previously unavailable resources being available;

computer usable program code for receiving input from the user to adjust resources within a specific system detail level; and computer usable program code for updating the specific system detail level to indicate the newly available resources.

20. The computer program product of claim 18, further comprising:

computer usable program code for receiving a notification of new resources being available;

computer usable program code for notifying a user of the new resources being available;

computer usable program code for receiving input from the user to adjust resources within a specific system detail level; and computer usable program code for updating the specific system detail level to indicate the new resources.

21. The computer program product of claim 18, further comprising:

computer usable program code for receiving a notification of new resources being available;

computer usable program code for notifying a user of the new resources being available;

computer usable program code for receiving input from the user to adjust resources within a new system detail level; and computer usable program code for updating the new system detail level to indicate the new resources.

* * * * *